United States Patent [19]

Whiteman

[11] Patent Number: 4,632,019
[45] Date of Patent: Dec. 30, 1986

[54] AIRPLANE AIRCONDITIONER

[76] Inventor: Gary D. Whiteman, 2630 Townsgate Rd., Westlake Village, Calif. 91361

[21] Appl. No.: 675,815

[22] Filed: Nov. 28, 1984

[51] Int. Cl.⁴ ............................................. F24F 7/007
[52] U.S. Cl. .......................................... 98/1; 62/237
[58] Field of Search .................. 62/237; 98/1, 6, 2.11, 98/2.12, 2.13, 31.6, 33.1, 34.6, 34.1, 87, 94.2, DIG. 7; 141/287, 312; 277/34.3; 285/97

[56] References Cited

U.S. PATENT DOCUMENTS

| | | | |
|---|---|---|---|
| 1,893,979 | 1/1933 | Barrere | 285/97 X |
| 2,257,221 | 9/1941 | Bell | 62/237 X |
| 2,439,487 | 4/1948 | Reilly | 98/6 X |
| 2,538,382 | 1/1951 | Reilly | 62/237 |
| 2,778,206 | 1/1957 | Wilson et al. | 62/237 X |
| 3,777,506 | 12/1973 | Hergatt et al. | 62/237 |
| 3,805,857 | 4/1974 | Johnson et al. | 141/287 |
| 4,469,152 | 9/1984 | Harvee et al. | 285/97 X |

FOREIGN PATENT DOCUMENTS 784119  4/1968  Canada ................................. 277/343

Primary Examiner—Harold Joyce
Attorney, Agent, or Firm—Koppel & Harris

[57] ABSTRACT

The aircraft pre-ventilation system has a ventilation unit mounted for movement along the ground. A primary and a return duct carry air between the ventilator and the aircraft door opening. The ducts are connected to a fitting which is designed to fit into and seal different size door openings for different aircraft. The fitting has a central rigid member, and a flexible bladder is attached to and surrounds the outside of the central member. The fitting is supporting by an adjustable arm for positioning the fitting in the door opening. When the fitting is properly positioned, the bladder expands to secure and seal the fitting to the aircraft door opening. The support arm that holds the fitting is hollow and carries pressurized air from the ventilator to a hose near the fitting that carries the air into the bladder.

6 Claims, 5 Drawing Figures

AIRPLANE AIRCONDITIONER

BACKGROUND OF THE INVENTION

1. Field of the Invention

This invention relates to a ground system designed to ventilate a variety of aircraft or structures especially executive and private airplanes.

2. Background of the Prior Art

When aircraft are parked on hot, sunny days, the interior temperature increases rapidly. Little ventilation is available. Many airplanes have only one door and no cooling air-conditioning. Air-conditioning must be powered, and it is uneconomical and possibly unsafe to use the main engine(s) to run an air-conditioner in a parked airplane.

The heating of the aircraft is a minor inconvenience when it is vacant, but a hot and/or humid airplane is most uncomfortable to embarking passengers. Because of the heat stored in the fuselage and contents of the airplane, the interior of the aircraft may not reach a comfortable temperature until well into the flight. Cooling does take place at higher altitudes where the air temperature is lower, but it may take many minutes to reach that altitude. The problem is compounded at major airports because there may be traffic delays in taking off. The problem is especially acute in executive jets and turboprop airplanes that may have pressurized cabins for flight at high altitudes. In those airplanes, the cabin is sealed before takeoff and the aircraft ventilation system cannot handle the preload of the heat in the plane. Occasionally also, an aircraft parked outside on a very cold day may be very cold inside and it may take many minutes into a flight before the passenger cabin is comfortably warm.

Various shelters may be used as warehouses, construction offices or the like. It may be uneconomical to provide these structures with permanent heating or cooling, but it may be desirable to heat or cool the structures on occasion.

Commercial airplanes have ground ventilation systems to ventilate parked airplanes. One of the earlier ones used a stand-alone air-conditioning unit mounted on a chassis for movement between aircraft parked at various gates at an airport. A flexible hose extended between the air-conditioning units and a fitting on the airplane for ventilating and cooling the interior of the airplane. Some commercial airplanes now have an auxiliary power unit APU which can be used for generating electrical power to run the ventilating systems and air-conditioning while the airplane is on the ground. The airplane may also be connected to an electrical source at the gate.

These options are not always available to executive and general aviation. They are not parked at a conventional gate, and few have an APU because of weight and cost considerations or have fittings for connection to the stand-alone air-conditioning units.

SUMMARY OF THE INVENTION

It is an object of the present invention to disclose and provide a pre-ventilation system for aircraft that do not have alternative systems available to them. Particularly it is an object of the present invention to disclose and provide a system that can be moved to an airplane, have a fitting attached and sealed to the door opening, have cool (or warm) air injected through a tube at the top of the fitting and have the air in the airplane return back to the air-conditioning unit (or heater) through a tube extending through the bottom of the fitting. Another object of the present invention is to provide a unit that seals to the door opening to prevent the outside air from also flowing through the door opening.

Unfortunately, there is no standard size door opening. It is an object of the present invention to make a universal fitting that can attach, secure and be sealed through the door opening irrespective of the size of the opening. These objects are met by the present invention. It includes a ventilator, which is preferably mounted on a chassis with wheels so that it can be moved to different, parked aircraft. A carrier, preferably in a form of a flexible, ventilator duct, is attached to the ventilator and to a fitting, which is designed to attach to various sizes of aircraft doors. The fitting has a central portion that is small enough to fit into the opening of most aircraft doors. The tube is attached to that portion. Extending around the central portion is a flexible bladder that expands to contract and seal the door opening. The bladder expands from air blown into it through a tube connected directly to the ventilator. Part of the tube is also a hollow support arm that connects to the fitting to help support the fitting and secure it to the ventilating unit.

Also, a return carrier duct is preferably provided for returning the air from the aircraft back to the ventilator for recirculation.

BRIEF DESCRIPTION OF THE DRAWINGS

FIG. 4 is partially in section.

DETAILED DESCRIPTION OF THE PREFERRED EMBODIMENT

Figure 1:
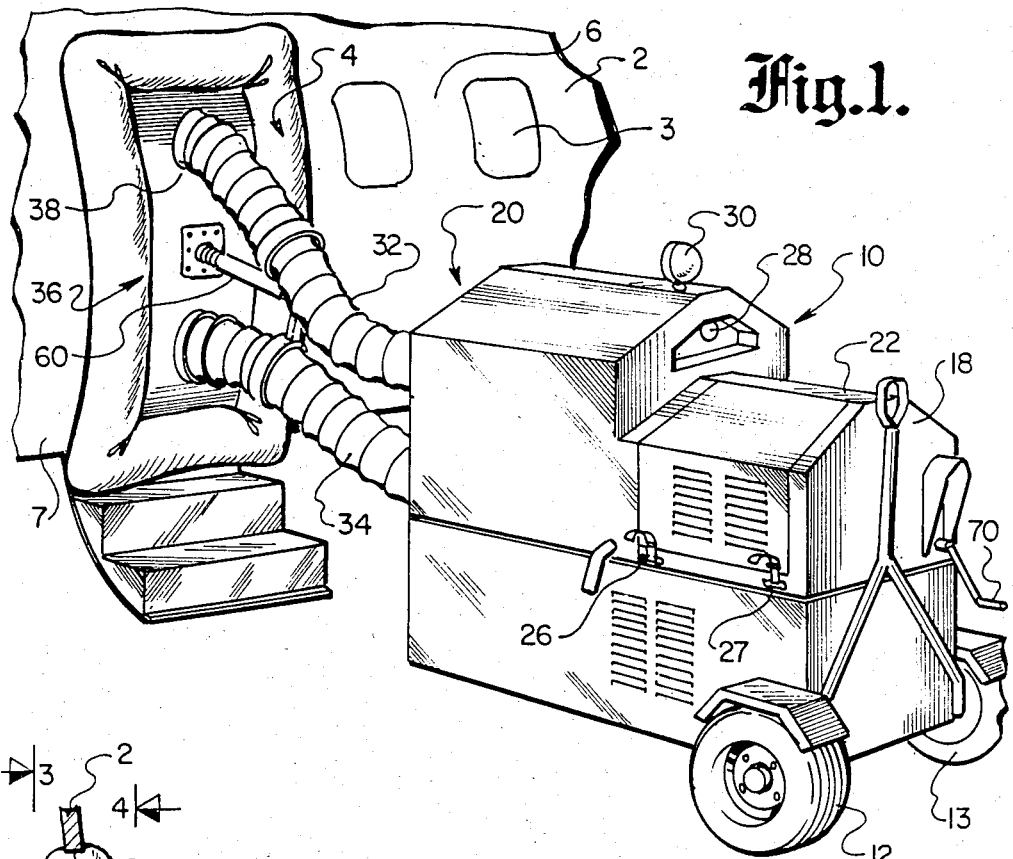
FIG. 1 is a perspective view of the aircraft pre-ventilation system of the present invention shown attached to an airplane.

FIG. 1 shows the pre-ventilation system of the present invention attached to an aircraft 2. The system of the present invention is designed to work with a variety of aircraft and potentially even non-flying vehicles, but aircraft 2 depicted in FIG. 1 is an executive airplane, which is intended to pressurized for high-altitude flying. Therefore, windows 3 are permanently sealed, and door opening 4 (blocked from view in FIG. 1) is sealed with a tight fitting door 7. FIG. 1 shows a side opening door 7, but some airplanes have doors that open upward. On a hot, humid day, and/or one in which the sun is shining brightly, the outside of fuselage 6, the air inside of airplane 2 and even the contents of the airplane increase in temperature, and there is little or no available ventilation.

Figure 2:
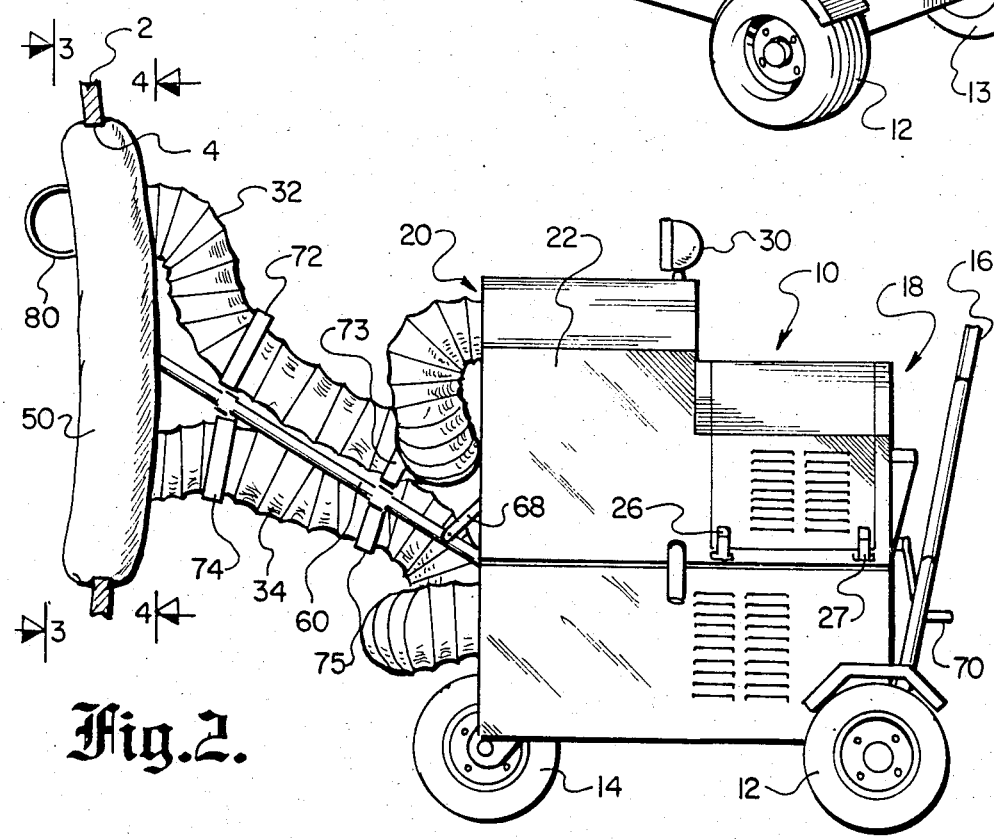
FIG. 2 is a front elevation of the aircraft pre-ventilation system of the present invention.
Figure 3:
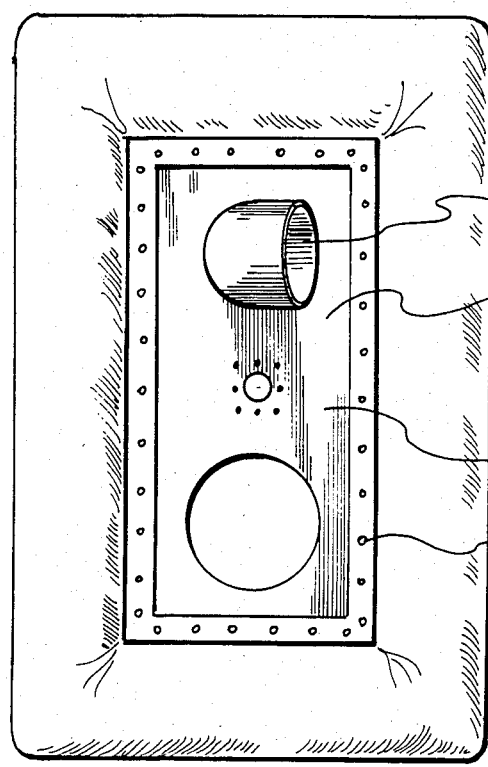
FIG. 3 is a side view of the inside of the fitting of the aircraft pre-ventilation system of the present invention taken through plane 3—3 of FIG. 2.

The aircraft pre-ventilation system of the present invention includes a ventilating unit 10 (FIGS. 1 and 2). The ventilating unit is designed to be portable and moved around the airport on wheels 12, 13 and 14

(FIGS. 1 and 2), and a tow bar 16 pivots from the rear end 18 for ease of transporting the system. One can move the entire unit by hand or with a small tow vehicle through the use of the tow bar. The mechanism that pivots tow bar 16 may interface with a brake for the wheels so that ventilator 10 is held stationary when tow bar 16 is in its up position (FIGS. 1 and 2). The internal parts of ventilator 10 are not shown, but they include a diesel or gasoline powered engine that powers an air-conditioner, which in turn includes a compressor, heat exchanger and cooling coil. A blower ventilates the heat exchanger and forces air over the cooling coils for use inside of the airplane.

The ventilator has at least one access door 24 secured by locks 26 and 27 to provide access to the internal parts during ventilation and for maintenance and other tasks. Gauges 28 (FIG. 1) may be provided for monitoring aspects of the operation of the ventilator. A lamp 30 on top of the ventilator is used for lighting the airplane and other parts of the aircraft pre-ventilation system of the present invention, some of which are now described.

Figure 5:
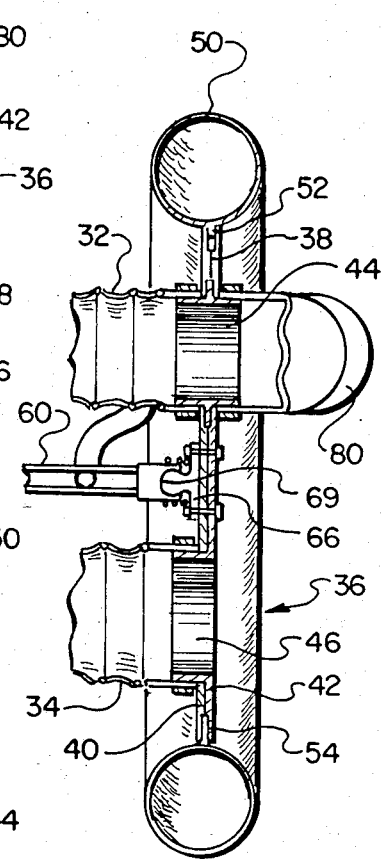
FIG. 5 is an elevation in section of the fitting of the aircraft pre-ventilation system of the present invention taken through plane 5—5 in FIG. 4.
Figure 4:
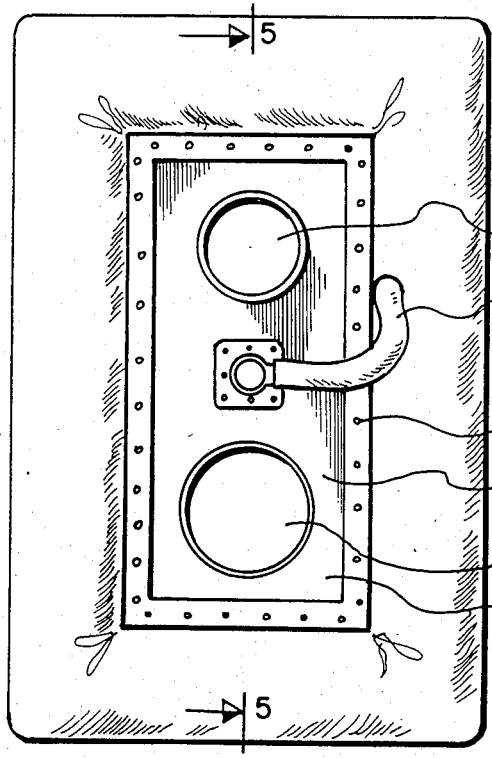
FIG. 4 is a side elevation from the other side of the fitting of the aircraft pre-ventilation system of the present invention taken through plane 4—4 of FIG. 2.

The fitting means (FIGS. 1, 3–5) is designed to attach the system of the present invention to the aircraft so that the air carriers, which comprise ducting 32 and 34, transport conditioned air from ventilator 10 through fitting 36 into aircraft 2. Fitting means 36 comprises a central rigid member 38 preferably formed of two sheets 40 and 42 of light weight, non-corrosive metal such as aluminum. Two openings 34 and 36 extend through sheets 40 and 42. Opening 34 carries air from ventilating unit 10 through duct 32, and opening 46 passes air from aircraft 2 through duct 34 and back to ventilating unit 10. Expandable expansion means in the form of a flexible, inflatable bladder 50 is attached to and surrounds central fitting member 38. In the exemplary embodiment (best shown in FIG. 5), when sheets 40 and 42 are formed, a notch 52 is formed around the edge of central member 38. A depending portion 54 of bladder 50 extends around the entire inside of bladder 50 and fits in notch 52. Rivets 56 extend through sheets 40 and 42 of central member 38 and secure the depending portion 54 in notch 52 (FIG. 5).

The height and width of central member 38 is chosen to be small enough to fit into the door opening of most executive aircraft when bladder 50 is in its collapsed position. In a manner described below, bladder 50 expands when air is pumped into it so that fitting 36 conforms to the door, and the outside of bladder 50 seals fitting 36 to that door to prevent hot, humid outside air from entering the cabin of aircraft 2.

Fitting 36 is supported by rigid support arm 60 (FIGS. 1, 2 and 5) that attaches to ball joint 62 on plate 64 riveted to the center of central member 38. The ball joint allows fitting 36 to pivot up and down and side to side for proper alignment with the aircraft door. Fitting 36 can also rotate to some degree to allow the fitting to compensate better for aircraft doors that might not be vertical or for minor differences in the slope of the pavement under the airplane and under the ventilator. Arm 60 also pivots on front end 20 of ventilator 10. Arm 60 is supported by link 68 (FIG. 2). Link 68 attaches to a traveler that engages in a worm gear (not shown) that is rotated by a handle 70 (FIGS. 1 and 2) at rear end 18 of ventilating unit 10. By adjusting the position of the traveler along the worm gear, link 68 pulls or releases arm 60, which in turn adjusts the height of fitting 36.

Arm 60 also carries two upper bands 72 and 73 for holding the upper duct 32 and two lower bands 74 and 75 for holding lower duct 34. Ducts 32 and 34 must have some freedom of movement when arm 60 is raised or lowered or when fitting 36 pivots up and down or side to side, but there should be some limit on the amount of movement of the ducts. Arm 60 provides support for fitting 36, but additional support is also provided by bladder 50 engaging door openings 4 of aircraft 2.

The ventilator 10 is also used for directing air into bladder 50. Passage means between the ventilator and the expansion means carries air from the ventilator into the expansion means. In the exemplary embodiment, the passage means is a part of arm 60, which is hollow and is used for directing pressurized air from ventilator 10 (FIG. 5). A short hose 78 extends from near the fitting end of arm 60 into the side of bladder 50. A valve or other controller (not shown) is provided for controlling the flow of pressurized air through arm 60 and hose 78 into bladder 50 when it is desired to seal 38 to door opening 4 of aircraft 2. The bladder is designed to leak continuously. Unless air flows into the bladder from arm 60 and hose 78, the bladder collapses. When one wants to release and remove fitting 36 from aircraft 2, the flow of air to bladder 50 from hose 78 and hollow arm 60 is stopped and the bladder deflates.

In the exemplary embodiment, upper duct 32 and opening 44 have a smaller diameter than lower duct 34 and opening 46. Upper duct 32 carries conditioned air at a higher velocity then return air in lower duct 34. To compensate for differences in the airflow, the lower duct 34 should be of somewhat greater diameter. Baffle 80 (FIGS. 2 and 5) may be provided for directing conditioned air to a desired location within the airplane. For example, if door opening 4 is near the front of the airplane, baffle 80 would face to the rear to direct conditioned air through the entire cabin, but if the door were at the rear of the airplane the baffle would direct air forward.

Various modifications and changes may be made in the configuration described above that come within the spirit of the invention. The invention embraces all such changes and modifications coming with the scope of the appended claims.

I claim:

1. An aircraft pre-ventilation system comprising:
   (a) a ventilator;
   (b) fitting means spaced from the ventilator receivable in an opening of the aircraft;
   (c) duct means extending between the ventilator and the fitting means for carrying air from the ventilator through the fitting means, through the aircraft opening and into the aircraft; and
   (d) expandable expansion means connected to the fitting means, passage means communicating between the ventilator and the expansion means for carrying air from the ventilator into the expansion means to expand the expansion means against the opening in the aircraft to secure the fitting means to the opening in the aircraft.

2. The aircraft pre-ventilation system of claim 1 wherein the fitting means comprises a generally rigid central member, the expansion means comprising a bladder surrounding the central member.

3. The aircraft pre-ventilation system of claim 1 wherein the passage means comprises arm means extending between the ventilator and the fitting means for supporting the fitting means at a position away from the ventilator.

4. The aircraft pre-ventilation system of claim 3 wherein the arm means is hollow at least in part.

5. The aircraft pre-ventilation system of claim 4 further comprising a hose extending between a portion of the hollow arm means and the expansion means for carrying pressurized air from the arm means to the expansion means.

6. The aircraft pre-ventilation system of claim 3 further comprising pivoting means between the arm means and the fitting means for permitting the pivoting of the fitting means relative to the arm means.

* * * * *